(12) United States Patent
Chang et al.

(10) Patent No.: US 9,227,371 B2
(45) Date of Patent: Jan. 5, 2016

(54) OPTICAL LENS, MOLD SET FOR MANUFACTURING THE OPTICAL LENS, AND METHOD OF MANUFACTURING THE OPTICAL LENS

(71) Applicant: Genius Electronic Optical Co., Ltd., Taichung (TW)

(72) Inventors: Kuo-Wen Chang, Taichung (TW); Ching-Hung Chen, Taichung (TW); Wen-Chang Liao, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 37 days.

(21) Appl. No.: 14/247,425

(22) Filed: Apr. 8, 2014

(65) Prior Publication Data

US 2015/0146303 A1 May 28, 2015

(30) Foreign Application Priority Data

Nov. 28, 2013 (CN) .......................... 2013 1 0624972

(51) Int. Cl.
| | | |
|---|---|---|
| *G02B 3/00* | (2006.01) | |
| *G02B 15/14* | (2006.01) | |
| *G02B 7/02* | (2006.01) | |
| *G03B 17/00* | (2006.01) | |
| *B29D 11/00* | (2006.01) | |

(52) U.S. Cl.
CPC ...... *B29D 11/0048* (2013.01); *B29D 11/00192* (2013.01); *G02B 3/0031* (2013.01)

(58) Field of Classification Search
CPC .......... G02B 3/00; G02B 7/10; G02B 25/002; G02B 7/02; G02B 7/04; G02B 7/08; G02B 7/102; G02B 21/14; F21V 9/08; G03B 17/14; H04N 5/2254; H04N 5/2251; H04N 5/2253
USPC ......... 359/642, 704, 809, 811–830, 703, 694; 362/455; 353/100; 396/529–530; 348/335, 340, 373–374

See application file for complete search history.

(56) References Cited

U.S. PATENT DOCUMENTS

| | | | | |
|---|---|---|---|---|
| 6,997,428 | B1 * | 2/2006 | Andino et al. ................ | 249/134 |
| 2006/0284327 | A1 * | 12/2006 | Yamamichi .................. | 264/1.32 |
| 2008/0055754 | A1 * | 3/2008 | Sakamoto .................... | 359/830 |
| 2009/0310223 | A1 * | 12/2009 | Matsuoka et al. ............ | 359/601 |

FOREIGN PATENT DOCUMENTS

| | | |
|---|---|---|
| TW | 200942893 A1 | 10/2009 |
| TW | 201130753 A1 | 9/2011 |
| TW | 201140151 A1 | 11/2011 |
| TW | 201202779 A1 | 1/2012 |
| TW | 201223743 A1 | 6/2012 |

* cited by examiner

*Primary Examiner* — Dawayne A Pinkney
(74) *Attorney, Agent, or Firm* — Baker & McKenzie LLP

(57) ABSTRACT

An optical lens includes a lens portion having an optical axis, and an exterior portion connected to an outer periphery of the lens portion. The exterior portion has first and second surfaces that are disposed along a direction parallel to the optical axis and spaced apart from each other, a first annular surface that extends from a periphery of the second surface parallelly with respect to the optical axis, and a second annular surface that interconnects the first annular surface and the first surface. The second annular surface extends obliquely with respect to the first annular surface.

6 Claims, 5 Drawing Sheets

OPTICAL LENS, MOLD SET FOR MANUFACTURING THE OPTICAL LENS, AND METHOD OF MANUFACTURING THE OPTICAL LENS

CROSS-REFERENCE TO RELATED APPLICATION

This application claims priority to Chinese Application No. 201310624972.3, filed on Nov. 28, 2013.

BACKGROUND OF THE INVENTION

1. Field of the Invention

The invention relates to an optical lens, a mold set for manufacturing the optical lens, and a method of manufacturing the optical lens.

2. Description of the Related Art

Referring to FIG. 1, in general, a mold set 80 is used to manufacture a lens 90 by injecting a molten lens material into the mold set 80, followed by cooling to solidify the lens material, and opening the mold set 80 to eject the lens 90 from the mold set 80. The phantom lines in FIG. 1 illustrate the lens 90 ejected from the mold set 80.

However, during the ejecting step, the lens 90 may deform due to friction between the mold set 80 and side walls 901, which receive normal force from the mold set 80. As a result, shape precision of the lens 90 may vary, resulting in adverse effects in the yield rate and productivity.

SUMMARY OF THE INVENTION

Therefore, an object of the present invention is to provide an optical lens that may reduce friction generated during removal from a mold set, so as to enhance the yield rate in manufacturing the optical lens.

According to one aspect of the present invention, an optical lens comprises a lens portion having an optical axis, and an exterior portion connected to an outer periphery of the lens portion. The exterior portion has:

a first surface and a second surface that are disposed along a direction parallel to the optical axis, and that are spaced apart from each other;

a first annular surface that is parallel to the optical axis, and that has a first annular edge connected to an outer periphery of the second surface, and a second annular edge spaced apart from the first annular edge; and a second annular surface that interconnects the second annular edge of the first annular surface and an outer periphery of the first surface, and that extends obliquely with respect to the first annular surface.

Another object of the present invention is to provide a mold set for manufacturing the optical lens of this invention.

According to another aspect of the present invention, a mold set for manufacturing the optical lens of the present invention comprises:

a first mold configured to form a lens surface of the lens portion of the optical lens, and the second surface of the exterior portion of the optical lens;

a second mold movable relative to the first mold, and configured to form another lens surface of the lens portion of the optical lens, as well as the first surface, the first annular surface, and the second annular surface of the exterior portion of the optical lens, wherein the first mold and the second mold cooperate to form a mold cavity therebetween; and a pair of ejector pins, each of which is movable to pass through the second mold and extend into the mold cavity.

According to yet another aspect of the present invention, a method of manufacturing an optical lens of the present invention comprises the steps of:

injecting a lens material into the mold cavity of the mold set of this invention, followed by cooling to solidify the lens material to form an optical lens;

separating the first mold and the second mold of the mold set from each other; and using the ejector pins of the mold set to eject the optical lens from the mold cavity.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
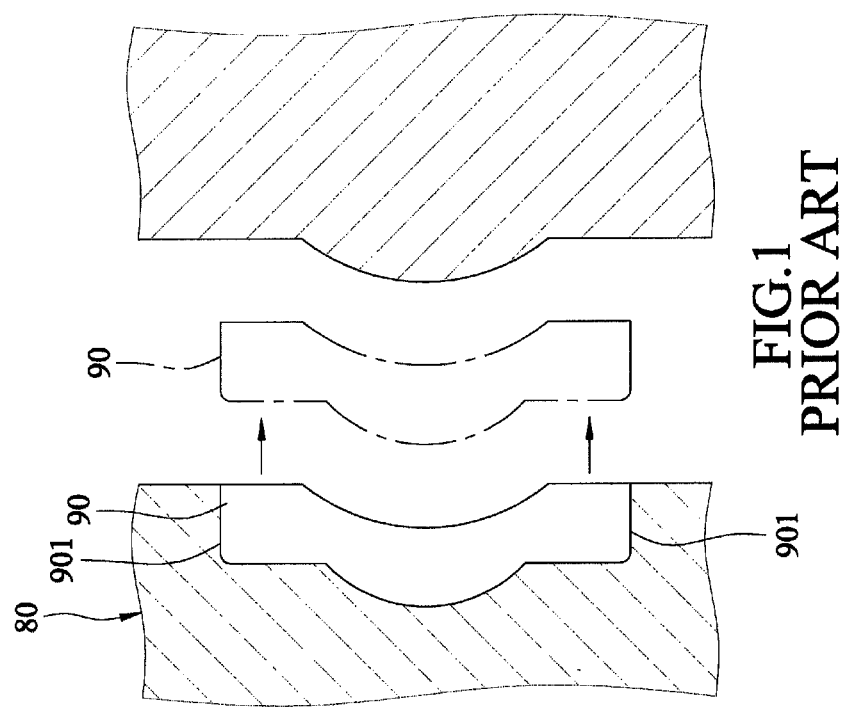
FIG. 1 is a schematic diagram illustrating a conventional optical lens that is ejected from a mold set.
Figure 2:
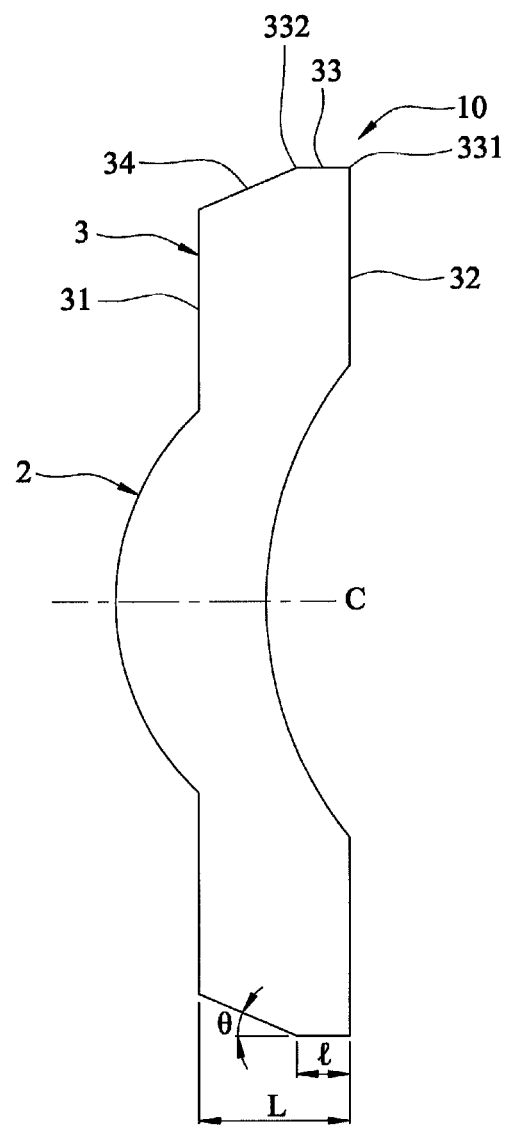
FIG. 2 is a schematic diagram showing a preferred embodiment of an optical lens according to the present invention.

Referring to FIG. 2, the preferred embodiment of the optical lens 10 according to this invention is shown to include a lens portion 2 and an exterior portion 3. In this embodiment, the lens portion 2 and the exterior portion 3 are integrally made of a plastic material.

The lens portion 2 extends outwardly from a central optical axis C, and is an area through which light primarily passes. In this embodiment, the lens portion 2 has opposite surfaces along the optical axis C and that are a convex object-side surface and a concave image-side surface. In other embodiments, the lens portion 2 may be biconvex or biconcave, or may have a concave object-side surface and a convex image-side surface, and should not be limited to the embodiment disclosed herein.

The exterior portion 3 is connected to an outer periphery of the lens portion 2 and extends outwardly. The exterior portion 3 has a first surface 31, a second surface 32, a first annular surface 33 and a second annular surface 34. The first and second surfaces 31, 32 are disposed along a direction parallel to the optical axis C, and are spaced apart from each other. The first annular surface 33 is parallel to the optical axis C, and has a first annular edge 331 connected to an outer periphery of the second surface 32, and a second annular edge 332 spaced apart from the first annular edge 331. The second annular surface 34 interconnects the second annular edge 332 of the first annular surface 33 and an outer periphery of the first surface 31, and extends obliquely with respect to the first annular surface 33. The optical lens 10 satisfies $0.01 \leq l/L \leq 0.65$, where l represents a minimum distance between the second surface 32 and the second annular surface 34, and L represents a minimum distance between the first surface 31 and the second surface 32. In this embodiment, $l/L=0.35$, that is, the minimum distance between the second surface 32 and the second annular surface 34, l, is smaller than half of the minimum distance between the first surface 31 and the second surface 32, L. In addition, the optical lens 10 satisfies 2°≤θ≤45°, where θ represents an angle supplementary to an angle formed between the first annular surface 33 and the second annular surface 34. In this embodiment, θ=23°. In such a condition, the exterior portion 3 may have a proper chamfer, so that the optical lens 10 has a relatively small area that receives a normal force from a mold set 20 (see FIG. 4) during the ejecting process, reducing friction between the mold set 20 and the optical lens 10. As a result, damage to the optical lens 10 may be prevented, and the yield rate may be promoted. However, if l is too small, although friction during mold removal process may be effectively reduced, when the optical lens 10 is assembled in a lens barrel 30 (see FIG. 3), the optical lens 10 may only have a small area to abut against the lens barrel 30. On the other hand, when l/L=0.65, the value of l may lead to a sufficient area for the optical lens 10 to abut against the lens barrel 30, so that the optical lens 10 may be fixed in the lens barrel 30 firmly. Preferably, when l≥13 mm, better abutment may be achieved. In addition, the angle θ should not be too large. The angle θ that is greater than 45° may result in a small first surface 31, which may affect an optical effective diameter of the optical lens 10, or disfavor assembly.

Figure 3:
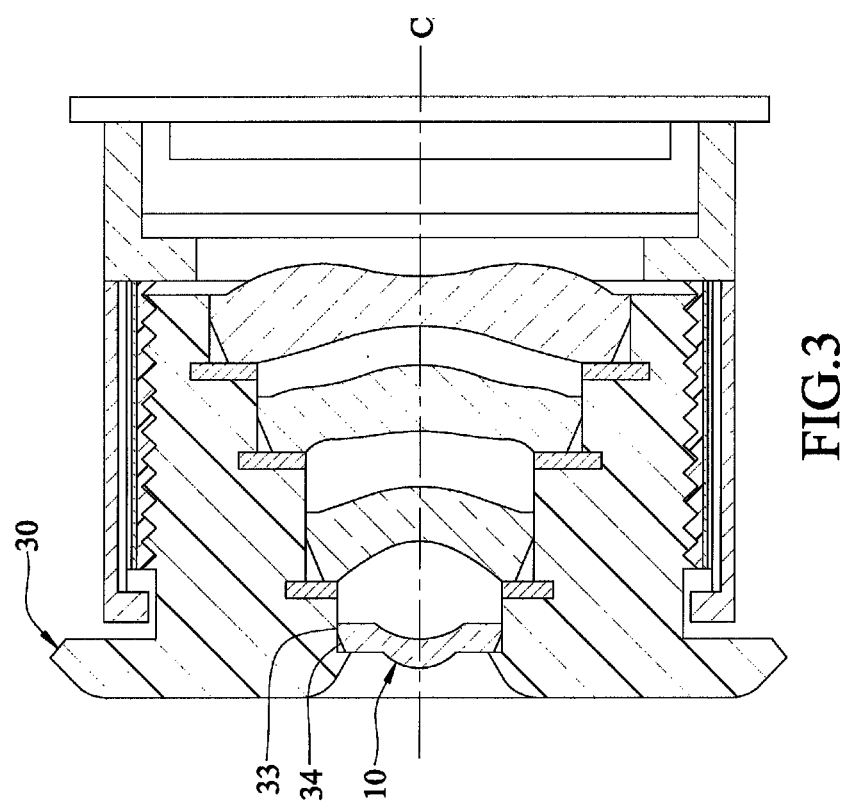
FIG. 3 is a sectional view illustrating arrangement of the preferred embodiment in a lens barrel.

FIG. 3 shows the optical lens 10 that is assembled in the lens barrel 30. By virtue of the second annular surface 34, the optical lens 10 may have a relatively smooth contour to avoid interference with the lens barrel 30 during assembly, and may be assembled in the lens barrel 30 more easily.

Figure 4:
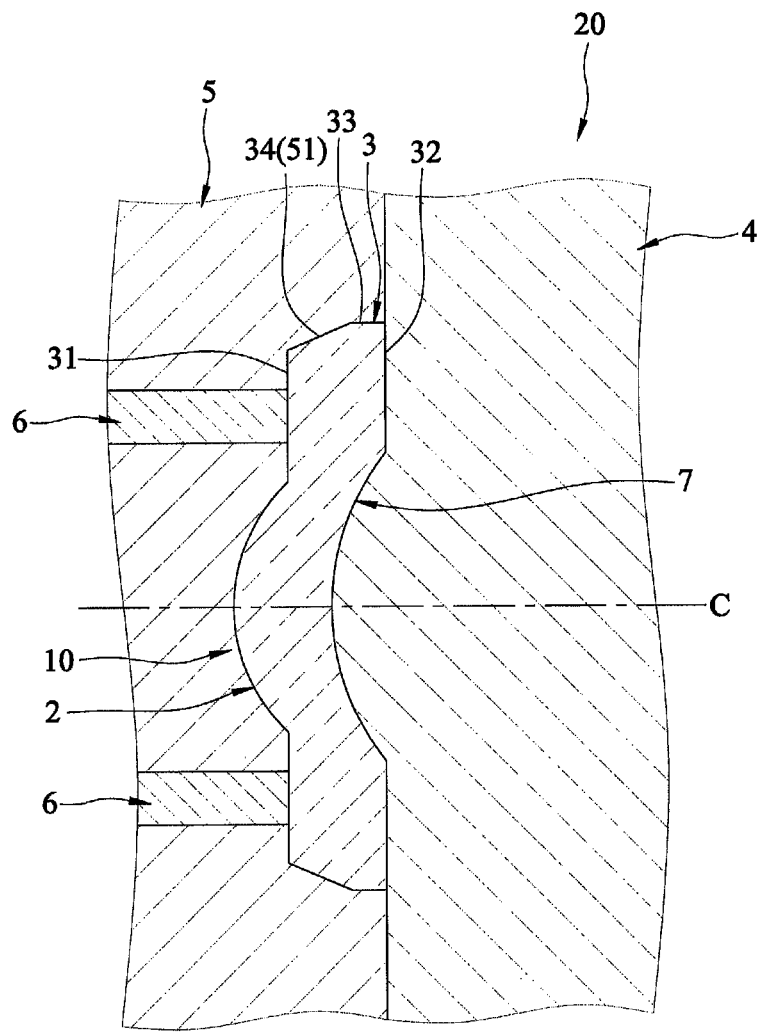
FIG. 4 is a sectional view illustrating a mold set for manufacturing the preferred embodiment.

FIG. 4 shows the mold set 20 for manufacturing the preferred embodiment of the optical lens 10. The mold set 20 includes a first mold 4, a second mold 5 and a pair of ejector pins 6.

The first mold 4 is configured to form a lens surface of the lens portion 2 of the optical lens 10, and the second surface 32 of the exterior portion 3 of the optical lens 10.

The second mold 5 is movable relative to the first mold 4, and is configured to form another lens surface of the lens portion 2 of the optical lens 10, as well as the first surface 31, the first annular surface 33, and the second annular surface 34 of the exterior portion 3 of the optical lens 10. The first mold 4 and the second mold 5 cooperate to form a mold cavity 7 therebetween. The second mold 5 has an annular mold surface 51 that is configured to form the second annular surface 34.

Each of the ejector pins 6 is movable to pass through the second mold 5 and extends into the mold cavity 7.

Figure 5:
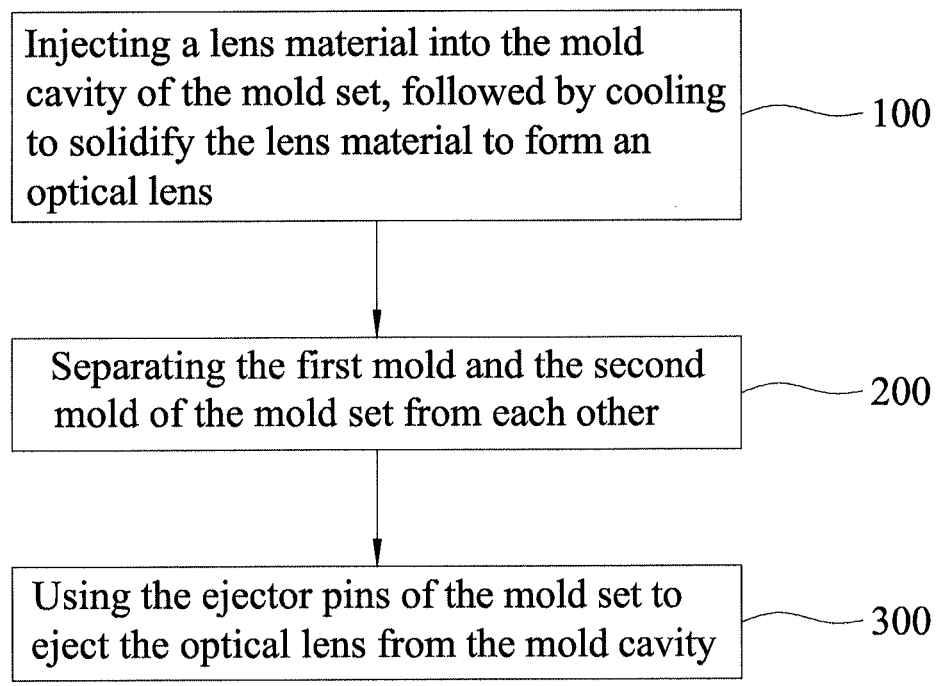
FIG. 5 is a flow chart illustrating steps of a method of manufacturing the preferred embodiment.

Referring to FIGS. 2, 4 and 5, a method of manufacturing the preferred embodiment of the optical lens 10 comprises the following steps:

Step 100: Injecting a lens material into the mold cavity 7 of the mold set 20, followed by cooling to solidify the lens material to form the optical lens 10.

Step 200: Separating the first mold 4 and the second mold 5 of the mold set 20 from each other.

Step 300: Using the ejector pins 6 of the mold set 20 to eject the optical lens 10 from the mold cavity 7.

To sum up, the present invention has the following advantages:

1. By virtue of the exterior portion 3 that has the first annular surface 33 and the second annular surface 34, the optical lens 10 may have a relatively small area that receives from the mold set 20 the force normal to the ejecting direction when the optical lens 10 is being ejected from the mold set 20, thus reducing friction between the optical lens 10 and the mold set 20, so as to prevent precision variation due to the process of mold removal, and to promote yield rate in production.

2. When l/L approaches 0.01, the small l may effectively reduce friction during the process of mold removal to prevent damage to the optical lens 10. When l/L approaches 0.65, l may be sufficiently large, so that the optical lens 10 may have a relatively large area to abut against the lens barrel 30, and the optical lens 10 may be fixed in the lens barrel 30 firmly.

3. By virtue of the second annular surface 34, interference that may occur between the optical lens 10 and the lens barrel 30 due to manufacturing inaccuracy may be prevented, so as to facilitate production.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An optical lens comprising:
   a lens portion having an optical axis; and
   an exterior portion connected to an outer periphery of said lens portion, and having:
      a first surface and a second surface that are disposed along a direction parallel to the optical axis, and that are spaced apart from each other;
      a first annular surface that is parallel to the optical axis, and that has a first annular edge connected to an outer periphery of said second surface, and a second annular edge spaced apart from said first annular edge; and
      a second annular surface that interconnects said second annular edge of said first annular surface and an outer periphery of said first surface, and that extends obliquely with respect to said first annular surface; wherein
   said optical lens satisfies $0.01 \leq l/L \leq 0.65$, where l represents a minimum distance between said second surface and said second annular surface, and L represents a minimum distance between said first surface and said second surface.

2. The optical lens as claimed in claim 1, satisfying $l/L \leq 0.45$, where l represents a minimum distance between said second surface and said second annular surface, and L represents a minimum distance between said first surface and said second surface.

3. The optical lens as claimed in claim 1, satisfying $2° \leq \theta \leq 45°$, where θ represents an angle supplementary to an angle formed between said first annular surface and said second annular surface.

4. The optical lens as claimed in claim 1, satisfying $l \geq 0.13$ mm, where l represents a minimum distance between said second surface and said second annular surface.

5. A mold set for manufacturing an optical lens, said mold set comprising:
   a first mold configured to form a lens surface of a lens portion of the optical lens, and a second surface of an exterior portion of the optical lens;
   a second mold movable relative to said first mold, and configured to form another lens surface of the lens portion of the optical lens, as well as a first surface, a first annular surface, and a second annular surface of the exterior portion of the optical lens, wherein said first mold and said second mold cooperate to form a mold cavity therebetween for forming the optical lens; and
   a pair of ejector pins, each of which is movable to pass through said second mold and extend into said mold cavity, wherein the first surface and the second surface are disposed along a direction parallel to the optical axis, and are spaced apart from each other;

the first annular surface is parallel to the optical axis, and has a first annular edge connected to an outer periphery of said second surface, and has a second annular edge spaced apart from said first annular edge; and the second annular surface that interconnects said second annular edge of said first annular surface and an outer periphery of said first surface, and that extends obliquely with respect to said first annular surface; wherein, said optical lens satisfies $0.01 \leq l/L \leq 0.65$, where l represents a minimum distance between said second surface and said second annular surface, and L represents a minimum distance between said first surface and said second surface.

6. A method of manufacturing an optical lens, said method comprising the steps of:

injecting a lens material into the mold cavity of a mold set, followed by cooling to solidify the lens material to form an optical lens; wherein the mold set comprises:

a first mold configured to form a lens surface of a lens portion of the optical lens, and a second surface of an exterior portion of the optical lens;

a second mold movable relative to said first mold, and configured to form another lens surface of the lens portion of the optical lens, as well as a first surface, a first annular surface, and a second annular surface of the exterior portion of the optical lens, wherein said first mold and said second mold cooperate to form a mold cavity therebetween for forming the optical lens; and a pair of ejector pins, each of which is movable to pass through said second mold and extend into said mold cavity, wherein the first surface and the second surface that are disposed along a direction parallel to the optical axis, and that are spaced apart from each other;

the first annular surface that is parallel to the optical axis, and that has a first annular edge connected to an outer periphery of said second surface, and a second annular edge spaced apart from said first annular edge; and the second annular surface that interconnects said second annular edge of said first annular surface and an outer periphery of said first surface, and that extends obliquely with respect to said first annular surface; wherein, said optical lens satisfies $0.01 \leq l/L \leq 0.65$, where l represents a minimum distance between said second surface and said second annular surface, and L represents a minimum distance between said first surface and said second surface;

separating the first mold and the second mold of the mold set from each other; and using the ejector pins of the mold set to eject the optical lens from the mold cavity.

* * * * *